US011941162B2

(12) United States Patent
Woo et al.

(10) Patent No.: US 11,941,162 B2
(45) Date of Patent: Mar. 26, 2024

(54) MOBILE APPARATUS AND VEHICLE DISPLAYING AUGMENTED REALITY IMAGE

(71) Applicants: Hyundai Motor Company, Seoul (KR); Kia Corporation, Seoul (KR)

(72) Inventors: Seunghyun Woo, Seoul (KR); Jae Yul Woo, Seoul (KR); Rowoon An, Seoul (KR); Soobin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 183 days.

(21) Appl. No.: 17/548,869

(22) Filed: Dec. 13, 2021

(65) Prior Publication Data

US 2022/0308656 A1  Sep. 29, 2022

(30) Foreign Application Priority Data

Mar. 24, 2021  (KR) ........................ 10-2021-0037937

(51) Int. Cl.
| G06T 19/00 | (2011.01) |
| B60Q 1/50 | (2006.01) |
| G06F 3/01 | (2006.01) |
| G06F 3/14 | (2006.01) |
| G06V 20/20 | (2022.01) |
| G06V 20/56 | (2022.01) |

(52) U.S. Cl.
CPC ................ *G06F 3/011* (2013.01); *B60Q 1/50* (2013.01); *G06F 3/14* (2013.01); *G06T 19/006* (2013.01); *G06V 20/20* (2022.01); *G06V 20/56* (2022.01)

(58) Field of Classification Search
None
See application file for complete search history.

(56) References Cited

U.S. PATENT DOCUMENTS

2019/0114839 A1  4/2019  Mott et al.

FOREIGN PATENT DOCUMENTS

| KR | 10-2012-0135126 A | 12/2012 |
| KR | 10-2014-0000805 A | 1/2014 |
| KR | 10-2020-0101034 A | 8/2020 |

*Primary Examiner* — Nicholas R Wilson
(74) *Attorney, Agent, or Firm* — Fox Rothschild LLP

(57) ABSTRACT

A mobile apparatus includes a display device, a location receiving device configured to receive current location information for obtaining a current location, an image obtaining device configured to obtain an image of a surrounding environment, and a controller configured to control display of image information on the image obtained by the image obtaining device during execution of an augmented reality mode, obtain information on a building in the image information based on at least one of the current location information or map information obtained by the location receiving device, and control the display device to overlap and display representative information on the obtained building of the image information.

18 Claims, 8 Drawing Sheets

MOBILE APPARATUS AND VEHICLE DISPLAYING AUGMENTED REALITY IMAGE

CROSS-REFERENCE TO RELATED APPLICATION(S)

This application claims under 35 U.S.C. § 119 the benefit of Korean Patent Application No. 10-2021-0037937, filed on Mar. 24, 2021 in the Korean Intellectual Property Office, the entire contents of which are incorporated by reference herein.

TECHNICAL FIELD

The disclosure relates to a mobile apparatus and a vehicle displaying an augmented reality image.

GROUND

With the recent development of digital technology, various types of mobile apparatuses are in greater use, including a mobile communication terminal, a smart phone, a tablet personal computer (PC), a notebook, a personal digital assistant (PDA), a wearable device, a digital camera, and a personal computer.

Recently, research and development of an augmented reality (AR) function in addition to a call function, a multimedia playback function (e.g., music playback, video playback), an Internet function, and a navigation function among functions that may be performed in a mobile apparatus are increasing.

Augmented reality is a technology exemplified by synthesizing virtual related information (e.g., text, images, etc.) with real objects (e.g., real environments). Unlike virtual reality (VR), which targets only virtual spaces and objects, the augmented reality provides a user with additional information that is difficult to obtain only in a real environment by providing a virtual related object to an object that is a real environment.

However, in the augmented reality function provided by a conventional mobile apparatus, the number of real objects and relevant information of the real objects provided in augmented reality increase, that is, numerous pieces of information are overlapped and displayed without rules within a limited screen, so that it is difficult for the user to understand the relevant information.

Therefore, the user would benefit from an augmented reality function that focuses the user's attention on relevant information.

SUMMARY

It is an aspect of the disclosure to provide a mobile apparatus and a vehicle capable of overlapping and displaying an image of a billboard in a building image, and displaying representative information about a building in the billboard image.

It is another aspect of the disclosure to provide a mobile apparatus and a vehicle capable of dividing an area of a billboard image into a plurality of regions based on information on the number of floors and the number of rooms in a building and displaying representative information of companies resident in the building in the plurality of divided regions Additional aspects of the disclosure will be set forth in part in the description which follows and, in part, will be obvious from the description, or may be learned by practice of the disclosure.

In accordance with an aspect of the disclosure, a mobile apparatus includes a display device, a location receiving device configured to receive current location information for obtaining a current location, an image obtaining device configured to obtain an image of a surrounding environment, and a controller configured to control display of image information on the image obtained by the image obtaining device during execution of an augmented reality mode, obtain information on a building in the image information based on at least one of the current location information or map information obtained by the location receiving device, and control the display device to overlap and display representative information on the obtained building of the image information.

The representative information may include at least one of a logo image, an emblem image, an advertisement image, or a sign image.

The controller may recognize a building in the image based on the map information, the current location information, and the image information, generate a billboard image corresponding to at least one of a size or shape of the recognized building based on the image information, and control the display device to overlap and display the generated billboard image on a building image for the recognized building.

The controller may obtain address information and representative information on companies and multi-use facilities resident in the recognized building, and control the display device to divide and display the representative information in columns and rows in the billboard image based on the address information.

The controller may identify information on the number of floors of the recognized building, divide the entire area of the billboard image into row regions by a plurality of rows based on the identified number of floors information, and control the display device to display the representative information in the divided row regions.

The controller may identify information on the number of floors and the number of rooms of the recognized building, divide the entire area of the billboard image into a plurality of regions by a plurality of rows and column based on at least one of the identified number of floors or number of rooms, and control the display device to display the representative information in the plurality of regions based on the identified number of floors and number of rooms.

When there is one of the company and multi-use facility resident in the recognized building, the controller may control the display device to integrate the entire area of the billboard image and display representative information on the one company and multi-use facility in the integrated billboard image.

The mobile apparatus may further include a communication device configured to communicate with an external server, wherein the controller may identify a place with a highest number of visits based on information on a number of visits of the companies and multi-use facilities resident in the building received by the communication device, and control the display device such that representative information on the identified place is displayed with more emphasis than the remaining representative information.

The controller may control the display device to display the representative information in the billboard image and to overlap and display the billboard image, on which the representative information is displayed, on the building image for the recognized building.

The emphasizing display may include changing and displaying at least one of a transparency, highlighting, color, or size of the representative information.

The mobile apparatus may further include a communication device configured to communicate with an external server, wherein the controller may identify a place with a highest preference based on information on preference of the companies and multi-use facilities resident in the building received by the communication device, and control the display device such that representative information on the identified place is displayed with more emphasis than the remaining representative information.

The mobile apparatus may further include a storage device configured to store favorite information, wherein the controller may determine whether a place set as a favorite among the companies and multi-use facilities resident in the building exists based on the stored favorite information, and control the display device such that representative information on the determined place is displayed with more emphasis than the remaining representative information when it is determined that a place set as the favorite exists.

The mobile apparatus may further include a storage device configured to store points of interest information, wherein the controller may determine whether a place set as a point of interest among the companies and multi-use facilities resident in the building exists based on the stored points of interest information, and control the display device such that representative information on the determined place is displayed with more emphasis than the remaining representative information when it is determined that a place set as the point of interest exists.

The controller may determine whether a place set as a point of interest among the companies and multi-use facilities resident in the building exists based on information on points of interest sorted by a user.

The controller may identify information on a vacancy in the recognized building, and control the display device to display the identified vacancy information as a preset vacancy indication image.

In accordance with an aspect of the disclosure, a vehicle includes a display device, a location receiving device configured to receive current location information for obtaining a current location, an image obtaining device configured to obtain an image of a road environment, and a controller configured to control display of image information on the image obtained by the image obtaining device during route guidance from the current location to a destination, obtain information on a building in the image information based on the current location information and map information obtained by the location receiving device, and control the display device to overlap and display representative information on the obtained building of the image information.

The controller may recognize a building in the image based on the map information, the current location information, and the image information, generate a billboard image corresponding to at least one of a size or shape of the recognized building based on the image information, and control the display device to display the representative information in the generated billboard image and overlap and display the billboard image on which the representative information is displayed on a building image for the recognized building.

The controller may obtain address information and representative information on companies and multi-use facilities resident in the recognized building, and control the display device to divide and display the representative information in columns and rows in the billboard image based on the address information.

The controller may identify information on the number of floors of the recognized building, divide the entire area of the billboard image into row regions by a plurality of rows based on the identified number of floors information, and control the display device to display the representative information in the divided row regions.

The controller may identify information on the number of floors and the number of rooms of the recognized building, divide the entire area of the billboard image into a plurality of regions by a plurality of rows and column based on at least one of the identified number of floors or number of rooms, and control the display device to display the representative information in the plurality of regions based on the identified number of floors and number of rooms.

The vehicle may further include a communication device configured to communicate with an external server, wherein the controller may identify a place with at least one of a highest number of visits or preference based on at least one of information on a number of visits or information on the preference of the companies and multi-use facilities resident in the building received by the communication device, and control the display device such that representative information on the identified place is displayed with more emphasis than the remaining representative information, and w % herein the emphasizing display may include changing and displaying at least one of a transparency, highlighting, color, or size of the representative information.

The vehicle may further include a storage device configured to store favorite information and points of interest information, wherein the controller may determine whether a place set as a favorite or a point of interest among the companies and multi-use facilities resident in the building exists based on at least one of the stored favorite information or points of interest information, and control the display device such that representative information on the determined place is displayed with more emphasis than the remaining representative information when it is determined that a place set as the favorite or the point of interest exists.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
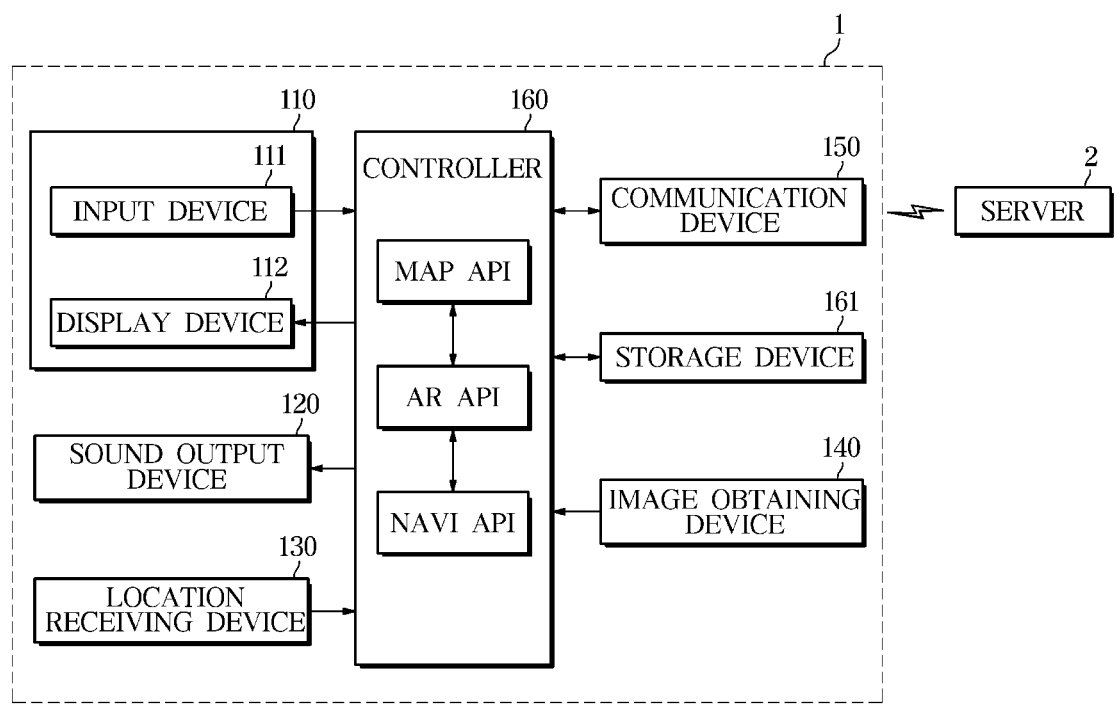
FIG. 1 is a control configuration diagram of a mobile apparatus according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Throughout the specification, like reference numerals refer to like elements. This specification does not describe all the elements of the embodiments, and duplicative contents between general contents or embodiments in the technical field of the disclosure will be omitted.

Throughout the specification, when a part is referred to as being "connected" to another part, it includes not only a direct connection but also an indirect connection, and the indirect connection includes connecting through a wireless network.

The terms 'first,' 'second,' etc. are used to distinguish one element from another element, and the elements are not limited by the above-mentioned terms.

In each step, an identification numeral is used for convenience of explanation, the identification numeral does not describe the order of the steps, and each step may be performed differently from the order specified unless the context clearly states a particular order.

Hereinafter, the disclosure will be described in detail with reference to the accompanying drawings.

FIG. 1 is a control configuration diagram of a mobile apparatus according to an embodiment, which will be described with reference to FIGS. 2 to 7.

A mobile apparatus 1 may be a terminal capable of being detachably mounted on a vehicle, or a terminal capable of being embedded in a dashboard of the vehicle. The mobile apparatus 1 may be a terminal that performs audio, video, and navigation functions in the vehicle.

The mobile apparatus 1 may be implemented as a computer or a portable terminal capable of accessing the vehicle through a network.

Herein, the computer may include, for example, a notebook, a desktop, a laptop, a tablet PC, a slate PC, and the like, on which a web browser is installed, and the portable terminal, which is a wireless communication device that ensures portability and mobility, may include all kinds of handheld based wireless communication devices, for example, such as a PCS (Personal Communication System), a GSM (Global System for Mobile communications), a PDC (Personal Digital Cellular), a PHS (Personal Handyphone System), a PDA (Personal Digital Assistant), an IMT (International Mobile Telecommunication)-2000, a CDMA (Code Division Multiple Access)-2000, an W-CDMA (W-Code Division Multiple Access), an WiBro (Wireless Broadband Internet) terminal, and a smart phone, and a wearable device such as a watch, a ring, a bracelet, an anklet, a necklace, a pair of glasses, a contact lens, and a head-mounted-device (HMD).

The mobile apparatus 1 includes a user interface 110, a sound output device 120, a location receiving device 130, an image obtaining device 140, a communication device 150, a controller 160, and a storage device 161.

The user interface 110 receives a user input and outputs various pieces of information so that the user may recognize. The user interface 110 may include an input device 111 and a display device 112.

The input device 111 receives a user input.

The input device 111 may receive a lock command, a lock release command, a power-on command, and a power-off command of the mobile apparatus 1, and may receive an image display command of the display device 112.

The input device 111 may receive operation commands for various functions executable by the mobile apparatus 1 and may receive setting values of various functions.

When the mobile apparatus 1 is provided in a vehicle, the input device 111 may receive operation commands for various functions to be performed in the vehicle.

For example, the functions performed in the mobile apparatus 1 may include a call function, a text function, an audio function, a video function, a navigation function, a map function, a broadcast playback function, a radio function, a content playback function, an Internet search function, and an augmented reality function, and may include a function of executing at least one application installed in the mobile apparatus 1.

The at least one application installed in the mobile apparatus 1 may be an application for providing at least one service to a user. Herein, the service may be to provide information for safety, convenience, and fun of the user.

The input device 111 may receive an execution command of a navigation application (NAVI API) for performing the navigation function, may receive an execution command of an augmented reality application (AR API) for performing the augmented reality function, and may receive an execution command of a map application (MAP API) for performing the map function.

The input device 111 may receive destination information in response to the execution of the navigation function, and may receive route selection information for selecting any one route among a plurality of routes.

The input device 111 may receive the destination information while the augmented reality function or the map function is executed.

The input device 111 may receive point of interest (POI) information on a point of interest (POI) during execution of the augmented reality function.

The input device 111 may be implemented as a jog dial or a touch pad for inputting a cursor movement command and an icon or button selection command displayed on the display device 112.

The input device 111 may include a hardware device such as various buttons or switches, a pedal, a keyboard, a mouse, a track-ball, various levers, a handle, and a stick.

Also, the input device 111 may include a graphical user interface (GUI) such as a touch panel, that is, a software device. The touch panel may be implemented as a touch screen panel (TSP) to form a layer structure with the display device 112.

The display device 112 may display execution information on at least one function performed in the mobile apparatus 1 in response to a control command of the controller 160 as an image, and may display information corresponding to a user input received by the input device 112 as the image.

When the mobile apparatus 1 is provided in the vehicle, the display device 112 may display operation information on various functions performed in the vehicle, and may display driving information of the vehicle. For example, the driving information may include at least one of driving speed, driving direction, shift information, or direction indication information.

Figure 2:
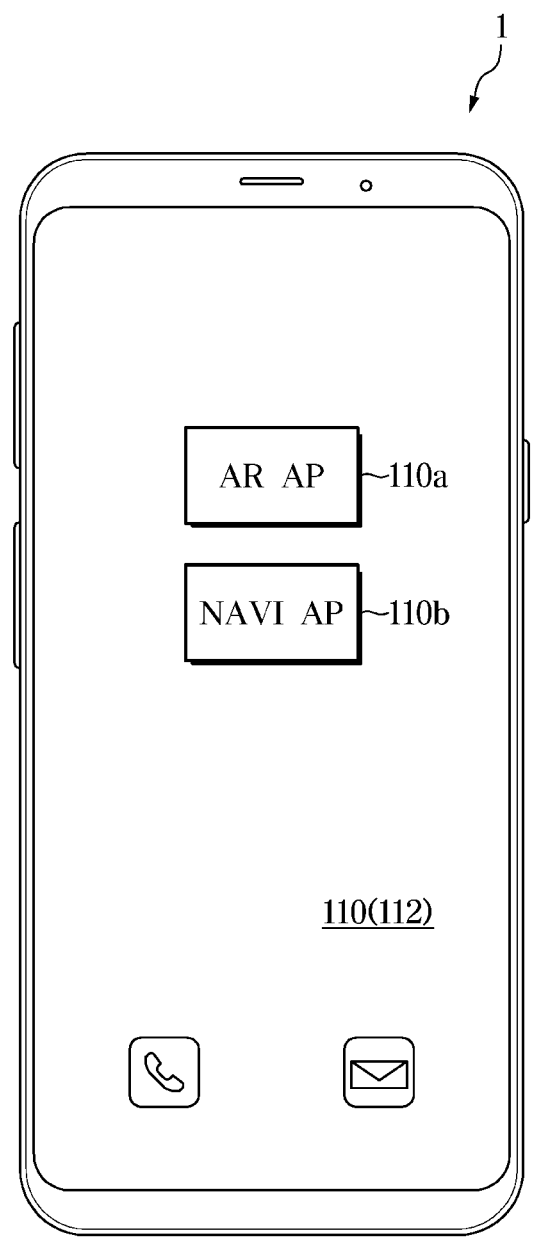
FIGS. 2 to 7 are exemplary display views of a display device of the mobile apparatus according to an embodiment.

The display device 112 may display an icon of an application for a function that may be performed in the mobile apparatus 1. For example, as illustrated in FIG. 2, the display device 112 may display an icon 110a of the augmented reality application and an icon 110b of the navigation application, and may display an icon of the map application.

The display device 112 may display map information, the destination information, and route guidance information while the navigation function is executed, and may display current location information about a current location. That is, the display device 112 may display a navigation image in which a route guidance image to a destination in the map image is matched with a current location image indicating the current location when the navigation function is executed.

Figure 3:
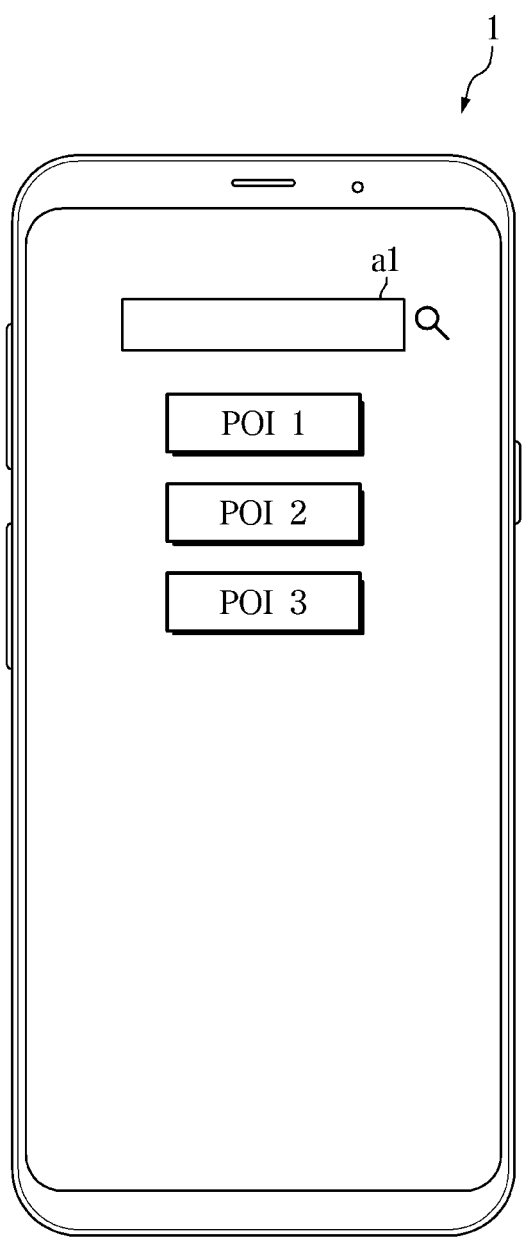

As illustrated in FIG. 3, the display device 112 may display a search window for searching for the POI in response to the user input and an icon of a pre-stored POI during execution of the augmented reality function. The display device 112 may display information on a previously searched or stored POI in the form of a button.

The display device 112 may display sort information on the POI during execution of the augmented reality function.

The sort information is attribute information about the POI selectable by the user, and may include, for example, a parking lot, a station, a restaurant, a house, a company, and may include information on a search range.

Figure 4:
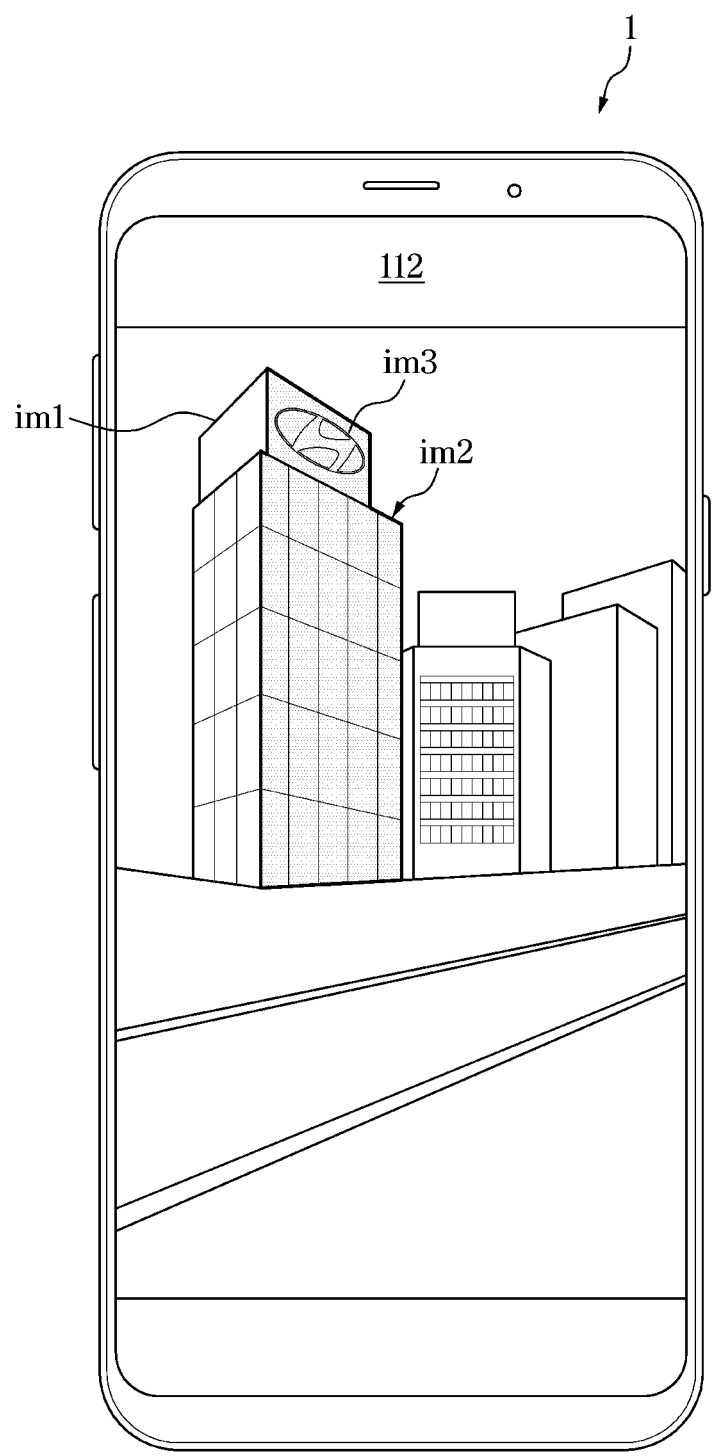

As illustrated in FIG. 4, the display device 112 may display representative information about companies or multi-use facilities in the building on at least one building image im1 during execution of the augmented reality function, and may display representative information im3 in the billboard image im2.

The multi-use facility refers to a facility that an unspecified number of people enter and use. For example, the multi-use facility may include all underground stations, underground shopping malls, waiting rooms of railways and passenger terminals, libraries, museums, art galleries, medical institutions, private institutes, Internet computer game facilities, large stores, movie theaters, etc. of a certain size or more.

The representative information may be a logo, emblem, sign or advertisement indicating the multi-use facility.

The display device 112 may also display representative information on the POI selected by the user during execution of the augmented reality function.

The display device 112 may display representative information of a multi-use facility included in favorite information by using an outline highlight.

The display device 112 may display representative information of multi-use facilities in different sizes based on the number of visits of users.

The display device 112 may also display by adjusting at least one of transparency or color of representative information in response to user registration information (individual member, corporate member, etc.).

The display device 112 may also display vacancy indication information on the billboard based on vacancy information in the building and address information on the vacancy.

The display device 112 may limit the display of the vacancy information on the billboard based on the vacancy information in the building and the address information on the vacancy.

Figure 5:
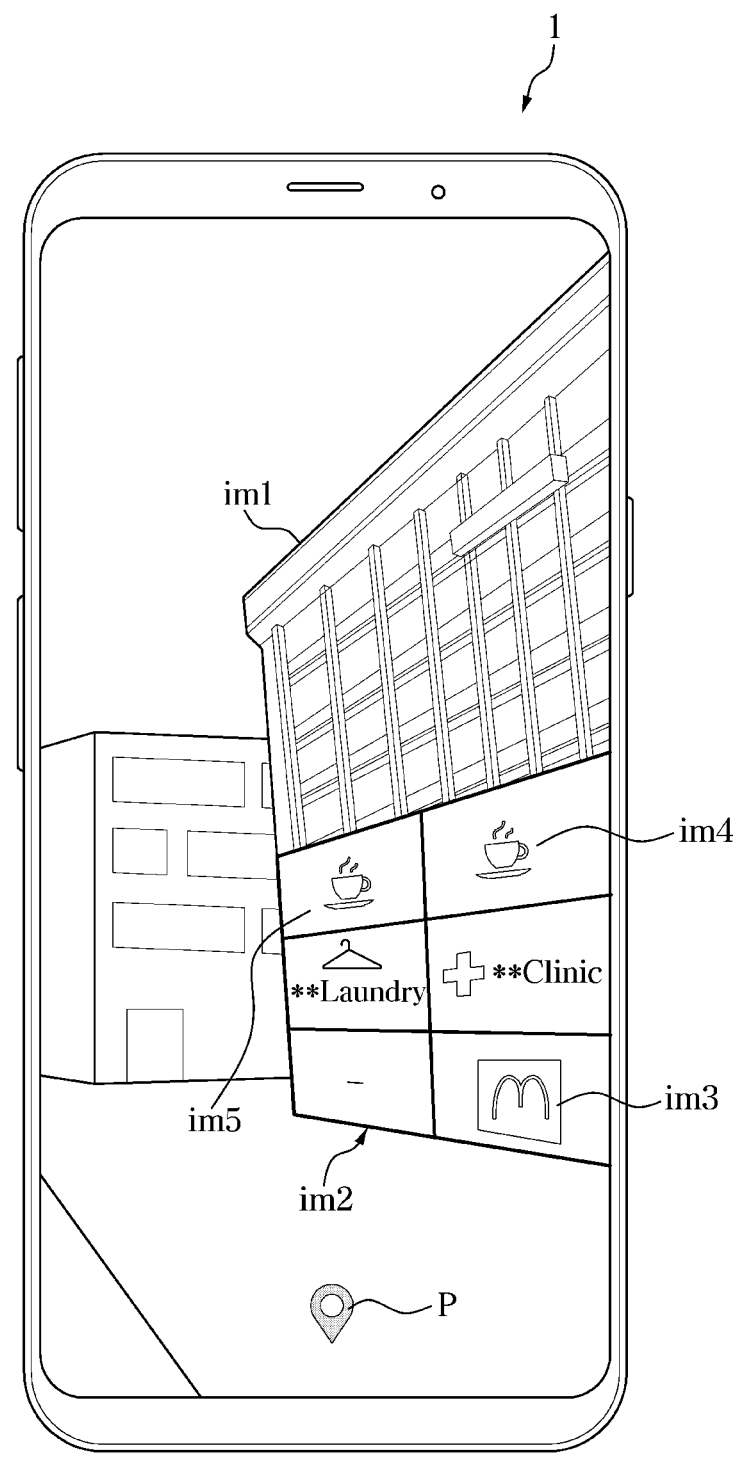

As illustrated in FIG. 5, the display device 112 may overlap and display the billboard image im2 on the building image im1. The billboard image im2 may be the representative information im3 displaying representative information in the regions divided by the number of floors and the number of rooms of the building, and may display current location information P for the current location of the user.

The display device 112 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto.

The mobile apparatus 1 may further include a sound receiving device (not shown) for receiving a voice of the user. In this case, the controller 160 may perform a voice recognition function and may recognize the user input through the voice recognition function.

The sound receiving device may include a microphone that converts sound waves into electrical signals. One or two or more of the microphones may be provided, and the one microphone may be directional.

The two or more microphones may be implemented as a microphone array.

The sound output device 120 may output a sound for a function being performed by the mobile apparatus 1. The sound output device 120 may include at least one or a plurality of speakers.

For example, the sound output device 120 may output route guidance information as a sound while the navigation function is being performed.

The speaker converts an amplified low-frequency audio signal into an original sound wave, generates a small wave in the air, and copies the sound wave, thereby outputting audio data as sound that the user may hear.

The location receiving device 130 receives a signal for obtaining the current location information on the current location of the mobile apparatus 1.

The location receiving device 130 may be a global positioning system (GPS) receiver that communicates with a plurality of GPS satellites. The GPS receiver includes an antenna module for receiving signals from the plurality of GPS satellites, and may include software for obtaining a current position by using distance and time information corresponding to position signals of the plurality of GPS satellites, and an output device for outputting the obtained vehicle location information.

The image obtaining device 140 obtains an image around the mobile apparatus 1 and transmits image information on the obtained image to the controller 160. The image information may be image data.

The image obtaining device 140 has a view of the front of the mobile apparatus 1.

The image obtaining device 140 may include at least one or a plurality of cameras for obtaining external images in forward and rearward directions of the mobile apparatus 1.

Assuming that a display surface of the display device of the mobile apparatus is a front surface of a body of the mobile apparatus, the at least one camera may be disposed on the front surface of the body of the mobile apparatus, and the other camera may be disposed on a rear surface of the body of the mobile apparatus. The rear surface may be a surface directing in a direction opposite to the direction of the front surface with respect to the body.

The image obtaining device 140 may include a CCD or CMOS image sensor as a camera, and may also include a three-dimensional spatial recognition sensor such as a KINECT (RGB-D sensor), a TOF (structured light sensor), and a stereo camera.

The communication device 150 may receive at least one application from an external server 2 and may receive update information on the installed application.

The communication device 150 may receive the number of visits of users to at least one of the multi-use facilities from the external server 2.

The communication device 150 may include one or more components that enable communication between internal components, and may include, for example, at least one of a short-range communication module, a wired communication module, or a wireless communication module.

The short-range communication module may include various short-range communication modules that transmit and receive signals using a wireless communication network in a short distance such as a Bluetooth module, an infrared communication module, an RFID (Radio Frequency Identification) communication module, an NFC (Near Field Communication) module, and a Zigbee communication module.

The wired communication module may include various wired communication modules such as a CAN (Controller Area Network) communication module, a LAN (Local Area Network) module, a WAN (Wide Area Network) module, and a VAN (Value Added Network) module, as well as various cable communication modules such as a USB (Universal Serial Bus), an HDMI (High Definition Multimedia Interface), a DVI (Digital Visual Interface), an RS-232 (recommended standard 232), power line communication, and a POTS (plain old telephone service).

The wired communication module may further include a local Interconnect network (LIN).

The wireless communication module, in addition to a Wi-Fi module and a wireless broadband module, may include wireless communication modules supporting various wireless communication methods such as a GSM (Global System for Mobile Communication), a CDMA (Code Division Multiple Access), a WCDMA (Wideband Code Division Multiple Access), a UMTS (Universal Mobile Telecommunications System), a TDMA (Time Division Multiple Access). LTE (Long Term Evolution), and an UWB (Ultra Wide-Band) module.

The controller 160 controls image display of the display device 112 based on at least one of the lock release command, the power-on command, or the image display command of the mobile apparatus 1 received in at least one of the input device 111, the image obtaining device 140, or the sound receiving device (not shown). In this case, as illustrated in FIG. 2, the display device 112 of the mobile apparatus 1 may display icons for functions that may be performed in the mobile apparatus 1.

The controller 160 may control the display of the execution image of the augmented reality function when an execution command of the augmented reality application is received by the input device 111, may control the execution of the navigation application so that the navigation application is activated, and may also control the execution of the map application so that the map application is activated.

The controller 160 may control the activation of the image obtaining device 140 when the execution command of the augmented reality application is received by the input device 111, and may control the activation of the location receiving device 130.

The controller 160 may perform image processing of the image obtained by the image obtaining device 140 when the image obtaining device 140 is activated and control the display of the image-processed image, and may obtain the current location information of the mobile apparatus 1 based on location information output from the location receiving device 130 when the location receiving device 130 is activated.

When touch position information received by the input device 111 corresponds to a display position of the icon of the augmented reality application, the controller 160 may determine that the execution command of the augmented reality application has been received.

When a selection signal of an execution button of the augmented reality application is received, the controller 160 may determine that the execution command of the augmented reality application has been received. The execution button of the augmented reality application may be a physical button.

The controller 160 may control the display device 112 to obtain an image of the building from image information on the image obtained by the image obtaining device 140 while performing an augmented reality mode, to overlap and display the representative information of the building on the obtained building image, to generate a billboard image corresponding to a size and shape of the building, to display the representative information on the building in the generated billboard image, and to overlap and display the billboard image on which the representative information is displayed on the building image.

The representative information includes at least one of a logo image, an emblem image, an advertisement image, or a sign image.

The controller 160 obtains building information on the building corresponding to the building image recognized based on the map information, the current location information, and the image information. The map information may be information stored in the storage device 161 and may be received from the server 2.

The building information may include the address information of the building, information on resident companies, information on the total number of floors, information on a parking lot location, and the like.

The company information may include representative information for recognizing a business type or name of the company, and address information of the company including at least one of a floor number or a room number.

The company information may further include information on preference, the number of visits, and the registration number of reviews.

The controller 160 may identify information on the number of floors of the building in the image based on the obtained building information, to divide the entire area of the billboard image into row regions by a plurality of rows based on the identified number of floors information, and may control the display device 112 to display the representative information in the divided row regions. That is, the controller 160 may identify the number of the highest floors in the obtained building information and address information, and determine the number of rows of the billboard image based on the identified number of floors.

Figure 6:
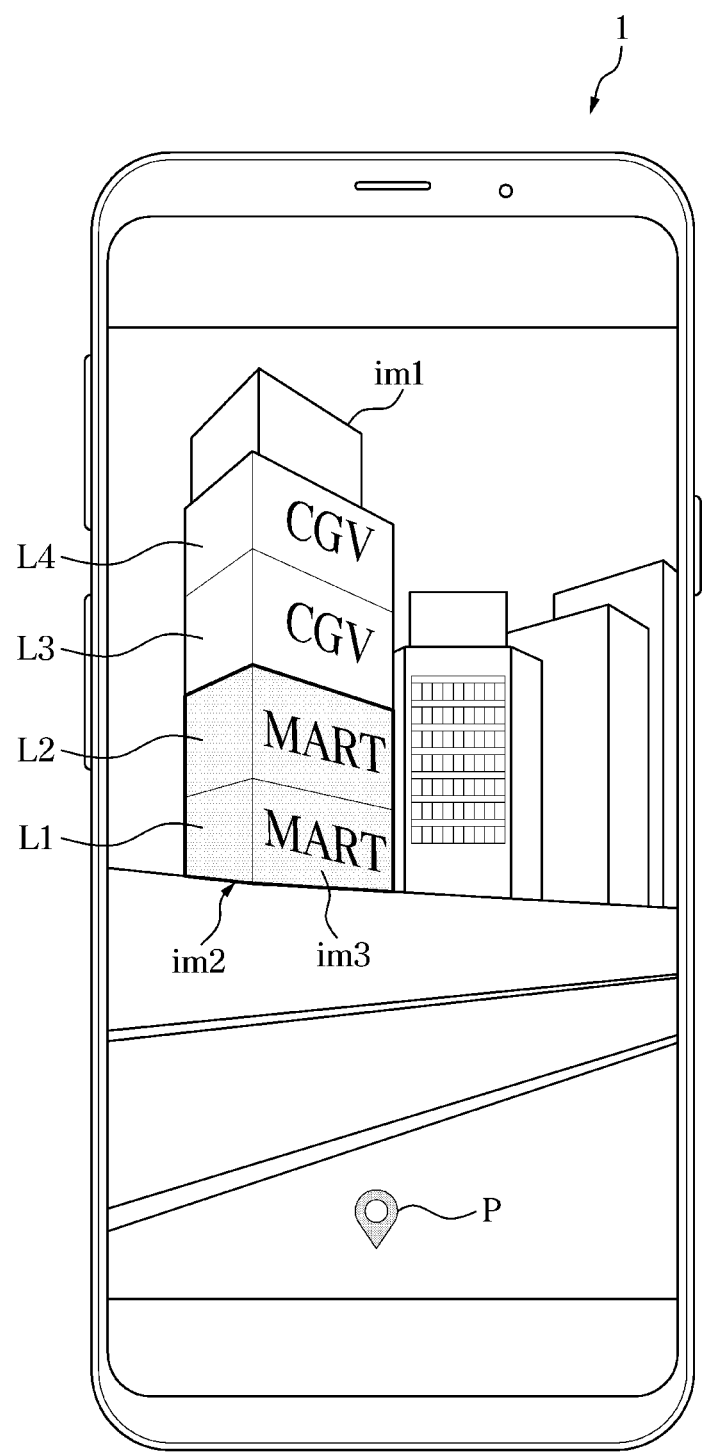

As illustrated in FIG. 6, the controller 160 may control the display device 112 to display the representative information im3 for each company in regions L1, L2, L3, and L4 of the respective rows in the billboard image im2 divided by matching the number of floors information on each company while overlapping the representative information im3 on the building image im1. Through this, the controller 160 may control the display device 112 to display altitude information of the building and altitude information of the companies resident in the building.

When it is determined that the building is a residence based on the obtained building information, the controller 160 may control the display device 112 to not display the representative information in a region corresponding to a residential region among the plurality of regions in the billboard image or to display only a residential name (e.g., apartment name, villa name, studio name).

When it is determined that the building is a residence based on the obtained building information, the controller 160 may control the display device 112 to delete and display a region corresponding to the residential region among the plurality of regions in the billboard image.

The controller 160 may identify the information on the number of floors and the number of rooms of the recognized building based on the obtained building information, obtain address information and representative information on companies and multi-use facilities in the recognized building, and control the display device 112 to divide and display the obtained representative information into columns and rows in the billboard image based on the obtained building information.

The controller 160 may control the display device 112 to display the representative information on each company in the regions of each row and column in the billboard image divided into columns and rows based on the address information on the companies and multi-use facilities in the recognized building.

Figure 7:
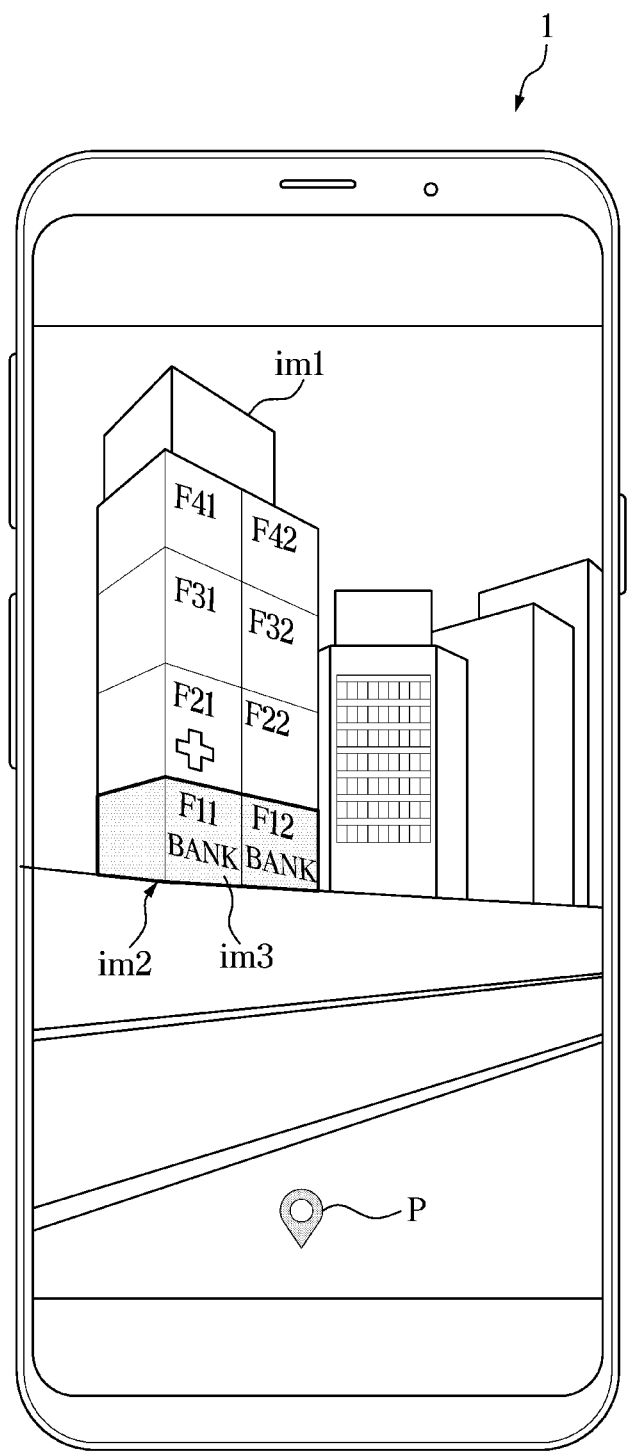

As illustrated in FIG. 7, the controller 160 may control the display device 112 to display the representative information im3 for each company in regions F11, F12, F21, F22, F31, F32, F41, and F42 of each row and column in the billboard image im2 divided by matching the number of floor and the number of room for each company, and to overlap and display the representative information im3 for each company on the building image im1.

When the controller 160 controls to display representative information of companies along the columns, the controller 160 may control the display device to display the representative information in each column from the left to the right of the building in the order of the alphabet and the order of small numbers based on information of the alphabet and Arabic numerals among the number of room information in the address information of the companies resident in the building.

As one example, when the number of room consists of English letters and numbers, the controller 160 controls to display representative information of number A01 in a left column in the billboard image and controls to display representative information of number A02 next to the representative information of the number A01.

As illustrated in FIG. 7, when the number of room consists of English letters and numbers, the controller 160 controls to display representative information of number F11 in the left column in the billboard image and controls to display representative information of number F12 next to the representative information of the number F11.

As another example, when the number of room consists of English letters A, B, and C, the controller 160 controls to display representative information of number A in the left column in the billboard image, to display the representative information of a number B next to the representative information of the number A, and to display the representative information of a number C next to the representative information of the number B.

As another example, when the number of room consists of numbers, the controller 160 controls to display representative information of a number 101 in the left column in the billboard image, and controls to display representative information of a number 102 next to the representative information of the number 101.

When the controller 160 controls to display the representative information of companies, in a case where it is determined that the address information of any one company does not include floor number information and room number information, the controller 160 may control the display device 112 to display representative information of any one company next to the representative information of any one company with the same business type or attribute among companies having the address information including the floor number or room number.

For example with reference to FIG. 5, when it is determined that room number information of a first cafe resident in the building is not included in the address information, the controller 160 may identify a second cafe having the address information including the room number information among the companies resident in the building, and control the display device 112 to display representative information im5 of the first cafe on one side of identified representative information im4 of the second cafe.

When it is determined that there is no floor number information in the address information of the building information, the controller 160 controls the display device 112 to display the representative information of the companies resident in the building on the billboard image based on at least one display condition of the number of registrations of the review among the number of visits, and to sequentially display the representative information of the companies from a first row corresponding to a first floor to the last row corresponding to the last floor.

When it is determined that there is no floor number information in the address information of the building information, the controller 160 controls the display device 112 to display the representative information of the companies resident in the building on the billboard image based on the at least one display condition of the number of registrations of the review among the number of visits, and to display the representative information of the companies resident in the building from a location close to the current location based on the current location information.

More specifically, when it is determined that there is no floor number information in the address information of the building information, the controller 160 identifies preference information on each company in the building among the display conditions, and controls the display device 112 to display the representative information of the companies from the highest preference order based on the identified preference information on each company and display the representative information of the companies in the order of preference from a location close to the current location based on the current location information.

When it is determined that there is no floor number information in the address information of the building information, the controller 160 may recognize floor number of the building in the image information based on the information of the company resident in the building.

When it is determined that there is no floor number information in the address information of the building information, the controller 160 identifies information on the number of visits for each company in the building among the display conditions, and controls the display device 112 to display the representative information of the companies in the order of the number of visits based on the identified information on the number of visits for each company and display the representative information of companies in the order of the number of visits from a location close to the current location based on the current location information.

When it is determined that there is no floor number information in the address information of the building information, the controller 160 identifies information on the registration number of reviews for each company in the building among the display conditions, and controls the display device 112 to display the representative information of the companies in the order of the registration number of reviews based on the identified registration information of the reviews for each company and display representative information of companies in the order of the registration number of reviews from a location close to the current location based on the current location information.

The controller 160 determines whether a place set as the favorite or the point of interest among the companies and multi-use facilities resident in the building exists based on the favorite information stored in the storage device 161, and may control the display device 112 such that the representative information on the determined place is emphasized more than the remaining representative information when it is determined that a place set as the favorite or the point of interest exists.

As illustrated in FIG. 6, when a "mart" is set as a point of interest by the user, the controller 160 may control the display device to emphasize a region to which the representative information corresponding to the "mart" belongs among the representative information in the billboard image overlapped on the building image.

The emphasizing display may include displaying by adjusting the transparency of a region to which representative information to be emphasized belongs among the plurality of regions of the billboard image to a first transparency. In this case, the transparency of a region to which the remaining representative information belongs may be a second transparency. Herein, the first transparency and the second transparency are different from each other.

The emphasizing display may include emphasizing a border of the region to which representative information to be emphasized belongs.

The emphasizing may include displaying a color of representative information to be emphasized as a first color, or displaying a background color of a region to which representative information to be emphasized belongs as a second color.

Representative information that is not an object to be emphasized may be displayed as a third color different from the first color, and a background color of the representative information that is not an object to be emphasized may be displayed as a fourth color different from the second color.

The emphasizing display may include displaying by adjusting a size of the representative information to be emphasized to a first size. In this case, the size of representative information that is not an object to be emphasized may be displayed as a second size different from the first size. Herein, the second size may be smaller than the first size.

The emphasizing display may include displaying the size of the region to which the representative information to be emphasized belongs as a third size. In this case, the size of the region to which the representative information that is not an object to be emphasized belongs may be displayed as a fourth size different from the third size. Herein, the fourth size may be smaller than the third size.

The controller 160 determines whether a place set as the point of interest among the companies and multi-use facilities in the building exists based on the point of interest information stored in the storage device 161, and may control the display device 112 such that the representative information on the determined place is displayed with more emphasis than the remaining representative information when it is determined that a place set as the point of interest exists.

The controller 160 may determine whether a place set as the point of interest among the companies and multi-use facilities in the building exists based on the sort information on the points of interest sorted by the user through the input device.

The controller 160 integrates the entire area of the billboard image when there is one of the company and multi-use facility in the recognized building, and controls the display device 112 to display representative information on the one company and multi-use facility in the integrated billboard image.

The controller 160 may identify the vacancy information in the recognized building and control the display device 112 to display the identified vacancy information as a preset vacancy indication image. For example, as illustrated in FIG. 3, the controller 160 may control the display device 112 to display the vacancy indication image (-).

The controller 160 may check the vacancy information in the recognized building and control the display device 112 to omit and display the checked vacancy information.

The controller 160 may transmit the POI information, sort information of the POI, favorite information, and preference information, which are stored in the storage device 161, to the augmented reality application while the augmented reality function is executed.

The controller 160 may control display of at least one of the search window for searching for a point of interest (POI) in response to the user input during execution of the augmented reality function, a route selection window for selecting any one route among a plurality of routes to a destination, or an image display window for displaying an augmented reality image.

The controller 160 may identify a place with the highest number of visits based on the information on the number of visits of the companies and multi-use facilities resident in the building, and may control the display device 112 such that representative information about the identified place is displayed with more emphasis than the remaining representative information.

The controller 160 may set the POI information received through the input device 111 as destination information, search for a route from the current location to the destination based on the set destination information and the current location information, and control the display device 112 to display information on the searched route.

When a plurality of routes are searched, the controller 160 may control the display device 112 to display information on the plurality of routes.

The controller 160 may control the display device 112 to display detailed information on each of the plurality of routes on one screen. The detailed information may include arrival time, moving distance, traffic information, and the like.

When any one of the plurality of routes is selected by the input device 111, the controller 160 may control the display device 112 to display detailed information on the selected route.

The controller 160 may control the display device 112 to display the image obtained by the image obtaining device 140 and the image for additional information together through the image display window based on a display command of the augmented reality image.

The controller 160 may identify the destination information input by the input device 111 during execution of the navigation function, identify the current location information received in the location receiving device 130, search for a route from the current location to the destination based on the identified current location information and destination information, obtain the route guidance information on the searched route, control the display device 112 to display a navigation image in which the current location information, destination information, and route information are matched on the map information, and control at least one of the display device 112 or the sound output device 120 to output the route guidance information based on the current location information.

When destination information is received in the augmented reality application in a state in which the augmented reality application is displayed during interworking of the navigation function and the augmented reality function, the controller 160 may transmit the received destination information to the navigation application, generate route information through the navigation application, and transmit the generated route information to the augmented reality application.

The storage device 161 stores the map information.

The storage device 161 may store the location information on the POI. The location information on the POI may include longitude and latitude values and may include the address information.

The POI may be a point selected by the user.

The storage device 161 may store the sort information on the POI.

The storage device 161 may store the favorite information, the number of visits information, and the preference information.

The storage device 161 may be implemented as at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto. The storage device 161 may be a memory implemented as a chip separate from the processor described above with respect to the controller 160, or may be implemented as a single chip with the processor.

At least one component may be added or deleted depending on the performance of the components of the mobile apparatus 1 illustrated in FIG. 1. It will be readily understood by those skilled in the art that the mutual positions of the components may be changed depending on the performance or structure of the system.

Each component illustrated in FIG. 1 means a software and/or hardware component such as a field programmable gate array (FPGA) and an application specific integrated circuit (ASIC).

Figure 8:
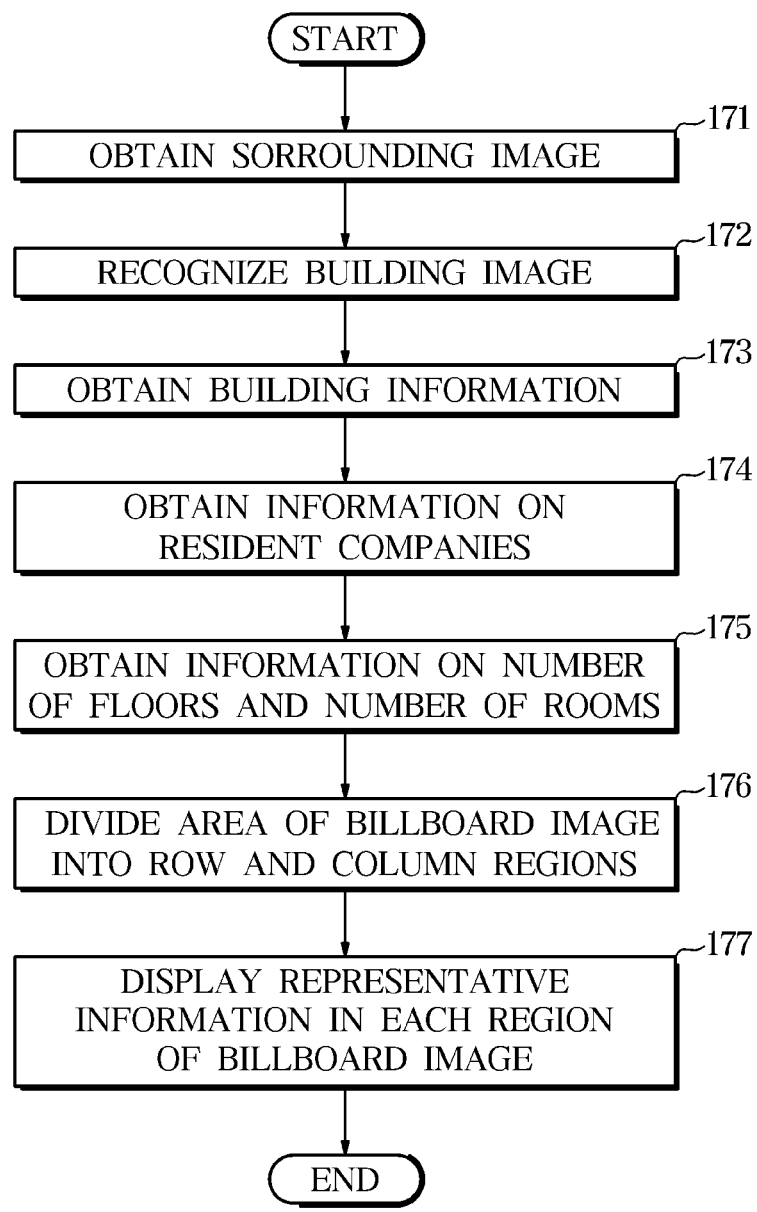
FIG. 8 is a control flowchart of the mobile apparatus according to an embodiment.

FIG. 8 is a control flowchart of the mobile apparatus according to an embodiment.

The mobile apparatus 1 displays a basic image on the display device 112 when at least one of the lock release command, the power-on command, or the image display command is received through the input device 111. That is, the mobile apparatus 1 may change the image display of the display device 112 from an inactive state to an active state. The basic image may be an image on a main screen, an image set by the user, or an image in which icons of applications executable in the mobile apparatus 1 are displayed.

The mobile apparatus 1 may perform the augmented reality function through execution of the augmented reality application when the execution command of the augmented reality application is received by the input device 111. In this case, the mobile apparatus 1 may display an execution image of the augmented reality function.

The mobile apparatus 1 obtains a surrounding image through the image obtaining device 140 while performing the augmented reality mode (171), and recognizes a building image from image information on the obtained surrounding image (172). In this case, the mobile apparatus 1 may obtain a building image for the point of interest selected by the user.

In a case in which the mobile apparatus 1 is provided in a vehicle, the mobile apparatus 1 may display an image for the augmented reality function in a navigation image when the destination information is received by the input device 111 while the navigation function is performed.

In a case in which the mobile apparatus 1 is provided in a vehicle, the mobile apparatus 1 may search for a route from the current location to the destination based on the current location information and the destination information in response to the navigation function, and may display route information on the searched route.

The mobile apparatus 1 may control activation of the image obtaining device 140 when the execution command of the augmented reality application is received by the input device 111, and may control activation of the location receiving device 130 in response to the execution of the navigation application.

Also, the mobile apparatus 1 may control to display the navigation image on a partial region of the display device 112 in response to an area division command of the display device 112, and may control to display the augmented reality image in the other region.

The mobile apparatus 1 obtains building information on a building corresponding to the building image recognized based on the map information, the current location information, and the image information (173).

The map information may be information stored in the storage device 161 or may be received from the server 2.

The building information may include building address information, resident company information, total number of floors information, parking lot location information, and the like. The company information may include representative information for recognizing a business type or name of the company, and address information of the company including at least one of the number of floors or the number of rooms.

The company information may further include information on preference, the number of visits, and the registration number of reviews.

The mobile apparatus 1 obtains address information and representative information on the companies and multi-use facilities resident in the building based on the obtained building information (174). In this case, the mobile apparatus 1 may obtain information on the number of floors of the building based on the address information on the companies and multi-use facilities resident in the building, and may obtain information on the number of floors the number of rooms of the building.

The mobile apparatus 1 obtains information on the number of floors of the building in the image based on the obtained building information, and may obtain information on the number of floors the number of rooms of the building (175).

The mobile apparatus 1 generates a billboard image based on a size and shape of the recognized building image.

The mobile apparatus 1 may divide the entire area of the billboard image into row regions by a plurality of rows based on the identified number of floors information. Also, the mobile apparatus 1 may divide the entire area of the billboard image into row and column regions by a plurality of rows and columns based on the information on the number of floors and the number of rooms of the building (176).

The mobile apparatus 1 may display the representative information on each company in the region of each row in the billboard image divided by matching the number of floors information on each company, and may overlap the representative information on each company on the building image. Through this, the mobile apparatus 1 may display the altitude information of the building and the altitude information of the companies in the building.

The mobile apparatus 1 may display the representative information on each company in the regions of each row and each column in the billboard image divided by matching the number of floors information and the number of rooms on each company, and may overlap the representative information on each company on the building image (177).

Also, when it is determined that there is no the number of floors information in the address information of the building information, the mobile apparatus 1 may display the representative information of the companies resident in the building on the billboard image based on a display condition of at least one of preference, or the registration number of reviews among the number of visits, and may sequentially display the representative information of the companies from the first row corresponding to the first floor to the last row corresponding to the last floor.

When it is determined that there is no the number of floors information in the address information of the building information, the mobile apparatus 1 may display the representative information of the companies resident in the building on the billboard image based on a display condition of at least one of preference, or the registration number of reviews among the number of visits, and may display the representative information of the companies resident in the building from a location close to the current location based on the current location information.

The mobile apparatus 1 may determines whether a place set as the favorite or the point of interest among the companies and multi-use facilities resident in the building exists based on the favorite information stored in the storage device 161, and may display such that the representative information on the determined place is emphasized more than the remaining representative information when it is determined that a place set as the favorite or the point of interest exists.

The emphasizing display may include displaying by adjusting the transparency of a region to which representative information to be emphasized belongs among the plurality of regions of the billboard image to the first transparency. In this case, the transparency of a region to which the remaining representative information belongs may be the second transparency. Herein, the first transparency and the second transparency are different from each other.

The emphasizing display may include emphasizing a border of the region to which representative information to be emphasized belongs.

The emphasizing may include displaying a color of representative information to be emphasized as the first color, or displaying a background color of a region to which representative information to be emphasized belongs as the second color.

Representative information that is not an object to be emphasized may be displayed as the third color different from the first color, and a background color of the representative information that is not an object to be emphasized may be displayed as the fourth color different from the second color.

The emphasizing display may include displaying by adjusting a size of the representative information to be emphasized to the first size. In this case, the size of representative information that is not an object to be emphasized may be displayed in the second size different from the first size. Herein, the second size may be smaller than the first size.

The emphasizing display may include displaying the size of the region to which the representative information to be emphasized belongs as the third size. In this case, the size of the region to which the representative information that is not an object to be emphasized belongs may be displayed as the fourth size different from the third size. Herein, the fourth size may be smaller than the third size.

The mobile apparatus 1 may identify the vacancy information in the recognized building and display the identified vacancy information as the preset vacancy indication image. For example, as illustrated in FIG. 3, the mobile apparatus 1 may display the vacancy indication image (-) in a region corresponding to a vacancy among the plurality of regions of the billboard image.

When the mobile apparatus 1 displays the representative information of the companies in the billboard image, the mobile apparatus 1, in a case where it is determined that the address information of any one company does not include the room number information, the mobile apparatus 1 may display representative information of any one company next to the representative information of any one company with the same business type among the companies having the address information including the floor number or room number.

Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, the disclosure can prevent information on points of interest (POIs) from being comprehensively placed in the middle when displaying the points of interest as augmented reality (AR) without elevation information.

That is, when the PO information is displayed as the augmented reality, the disclosure displays altitude information on companies based on address information included in map information and user selection information (preference, number of visits, and favorites) instead of longitude and altitude information, so that the visibility of a user can be maximized. Therefore, the disclosure can maximize the convenience of user and improve the utility of commercial services.

Further, when a developer developing an augmented reality application creates an essential point cloud map and builds a system to utilize the visual slam technology, which is a core of augmented reality, the developer can quickly launch augmented reality navigation service, which is an innovative technology, on the market by first building points of interest that users are interested in instead of building for the entire area.

As such, the disclosure can improve the quality and marketability of a mobile apparatus and vehicle, increase user satisfaction, improve the convenience and reliability of the user and the safety of the vehicle, and secure the competitiveness of a product.

What is claimed is:

1. A mobile apparatus, comprising:
    a display device;
    a location receiving device configured to receive current location information for obtaining a current location;
    an image obtaining device configured to obtain an image of a surrounding environment; and
    a controller configured to control display of image information on the image obtained by the image obtaining device during execution of an augmented reality mode, obtain information on a building in the image information based on at least one of the current location information or map information obtained by the location receiving device, and control the display device to overlap and display representative information on the obtained building of the image information,
    wherein the controller recognizes the building in the image based on the map information, the current location information, and the image information, obtains address information and the representative information on companies and multi-use facilities resident in the recognized building, and controls the display device to divide and display the representative information in columns and rows in a billboard image based on the address information.

2. The mobile apparatus according to claim 1, wherein the representative information comprises at least one of a logo image, an emblem image, an advertisement image, or a sign image.

3. The mobile apparatus according to claim 1, wherein the controller generates the billboard image corresponding to at least one of a size or shape of the recognized building based on the image information, and controls the display device to overlap and display the billboard image on a building image for the recognized building.

4. The mobile apparatus according to claim 1, wherein the controller identifies information on a number of floors of the recognized building, divides an entire area of the billboard image into row regions by a plurality of rows based on the identified number of floors information, and controls the display device to display the representative information in the divided row regions.

5. The mobile apparatus according to claim 1, wherein the controller identifies information on a number of floors and a number of rooms of the recognized building, divides an entire area of the billboard image into a plurality of regions by a plurality of rows and column based on at least one of the identified number of floors or the number of rooms, and controls the display device to display the representative information in the plurality of regions based on the identified number of floors and the number of rooms.

6. The mobile apparatus according to claim 1, further comprising:
    a communication device configured to communicate with an external server,
    wherein the controller identifies a place with a highest number of visits based on information on a number of visits of the companies and multi-use facilities resident in the building received by the communication device, and controls the display device such that representative information on the identified place is displayed with more emphasis than the remaining representative information,
    wherein the emphasizing display comprises changing and displaying at least one of a transparency, highlighting, color, or size of the representative information.

7. The mobile apparatus according to claim 6, wherein the controller controls the display device to display the representative information in the billboard image and to overlap and display the billboard image, on which the representative information is displayed, on the building image for the recognized building.

8. The mobile apparatus according to claim 1, further comprising:
    a communication device configured to communicate with an external server,
    wherein the controller identifies a place with a highest preference based on information on preference of the companies and multi-use facilities resident in the building received by the communication device, and controls the display device such that representative information on the identified place is displayed with more emphasis than the remaining representative information.

9. The mobile apparatus according to claim 1, further comprising:
    a storage device configured to store favorite information,
    wherein the controller determines whether a place set as a favorite among the companies and multi-use facilities resident in the building exists based on the stored favorite information, and controls the display device such that representative information on the determined place is displayed with more emphasis than the remaining representative information when it is determined that the place set as the favorite exists.

10. The mobile apparatus according to claim 1, further comprising:
a storage device configured to store points of interest information,
wherein the controller determines whether a place set as a point of interest among the companies and multi-use facilities resident in the building exists based on the stored points of interest information, and controls the display device such that representative information on the determined place is displayed with more emphasis than the remaining representative information when it is determined that the place set as the point of interest exists.

11. The mobile apparatus according to claim 10, wherein the controller determines whether the place set as the point of interest among the companies and multi-use facilities resident in the building exists based on the points of interest information sorted by a user.

12. The mobile apparatus according to claim 1, wherein the controller identifies information on a vacancy in the recognized building, and controls the display device to display the identified vacancy information as a preset vacancy indication image.

13. A vehicle, comprising:
a display device;
a location receiving device configured to receive current location information for obtaining a current location;
an image obtaining device configured to obtain an image of a road environment; and
a controller configured to control display of image information on the image obtained by the image obtaining device during route guidance from the current location to a destination, obtain information on a building in the image information based on the current location information and map information obtained by the location receiving device, and control the display device to overlap and display representative information on the obtained building on the image information,
wherein the controller recognizes the building in the image based on the map information, the current location information, and the image information, identifies information on a number of floors of the recognized building, divides an entire area of a billboard image into row regions by a plurality of rows based on the identified number of floors information, and controls the display device to display the representative information in the divided row regions.

14. The vehicle according to claim 13, wherein the controller generates the billboard image corresponding to at least one of a size or shape of the recognized building based on the image information, and controls the display device to display the representative information in the billboard image and overlap and display the billboard image on which the representative information is displayed on a building image for the recognized building.

15. The vehicle according to claim 14, wherein the controller obtains address information and representative information on companies and multi-use facilities resident in the recognized building, and controls the display device to divide and display the representative information in columns and rows in the billboard image based on the address information.

16. The vehicle according to claim 14, wherein the controller identifies information on a number of floors and a number of rooms of the recognized building, divides an entire area of the billboard image into a plurality of regions by a plurality of rows and column based on at least one of the identified number of floors or the number of rooms, and controls the display device to display the representative information in the plurality of regions based on the identified number of floors and the number of rooms.

17. The vehicle according to claim 14, further comprising:
a communication device configured to communicate with an external server,
wherein the controller identifies a place with at least one of a highest number of visits or preference based on at least one of information on a number of visits or information on the preference of the companies and multi-use facilities resident in the building received by the communication device, and controls the display device such that representative information on the identified place is displayed with more emphasis than the remaining representative information, and
wherein the emphasizing display comprises changing and displaying at least one of a transparency, highlighting, color, or size of the representative information.

18. The vehicle according to claim 14, further comprising:
a storage device configured to store favorite information and points of interest information,
wherein the controller determines whether a place set as a favorite or a point of interest among the companies and multi-use facilities resident in the building exists based on at least one of the stored favorite information or the points of interest information, and controls the display device such that representative information on the determined place is displayed with more emphasis than the remaining representative information when it is determined that the place set as the favorite or the point of interest exists.

* * * * *